United States Patent
Loth et al.

(10) Patent No.: US 6,346,572 B1
(45) Date of Patent: *Feb. 12, 2002

(54) IMPACT-RESISTANT MOLDING COMPOUND MADE OF STYRENE POLYMERS

(75) Inventors: Wolfgang Loth, Bad Dürkheim; Konrad Knoll, Ludwigshafen; Hermann Gausepohl, Mutterstadt, all of (DE)

(73) Assignee: BASF Aktiengesellschaft, Ludwigshafen (DE)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/981,424
(22) PCT Filed: Jun. 20, 1996
(86) PCT No.: PCT/EP96/02679
§ 371 Date: Dec. 23, 1997
§ 102(e) Date: Dec. 23, 1997
(87) PCT Pub. No.: WO97/01601
PCT Pub. Date: Jan. 16, 1997

(30) Foreign Application Priority Data

Jun. 29, 1995 (DE) ......................................... 195 23 585

(51) Int. Cl.$^7$ .......................... C08L 25/08; C08L 25/10; C08L 25/12
(52) U.S. Cl. .............................. 525/94; 525/95; 525/96; 525/98; 525/99
(58) Field of Search ............................... 525/94, 95, 96, 525/98, 99

(56) References Cited

U.S. PATENT DOCUMENTS

| | | | |
|---|---|---|---|
| 4,122,134 A | * 10/1978 | Miki et al. | |
| 4,783,508 A | * 11/1988 | Moore et al. | ................ 525/310 |
| 5,223,577 A | * 6/1993 | Baumgartner et al. | ...... 525/149 |
| 5,231,142 A | 7/1993 | Tsubokura et al. | .......... 525/316 |
| 5,434,219 A | * 7/1995 | Oomura et al. | ................ 525/84 |

FOREIGN PATENT DOCUMENTS

| | | |
|---|---|---|
| CA | 2125534 | 12/1994 |
| DE | 42 09 031 | 3/1992 |
| GB | 1514005 | * 6/1978 |

* cited by examiner

*Primary Examiner*—Jeffrey Mullis
(74) *Attorney, Agent, or Firm*—Keil & Weinkauf

(57) ABSTRACT

A molding material as based on from 60 to 98% by weight of a hard matrix A comprising polymerized or copolymerized units of at least one vinylaromatic monomer or at least one vinylaromatic monomer and at least one polar comonomer and from 2 to 40% by weight, the percentages in each case being based on the molding material comprising A and B, of a soft phase B formed from a hydrogenated or unhydrogenated block copolymer prepared by anionic polymerization and comprising a vinylaromatic monomer V and a diene D, having at least one random or quasi-random block (V/D) of vinylaromatic monomer and diene and containing from 10 to 80% by weight, based on the soft phase B, of occlusions of matrix material (a) formed during the polymerization of the hard matrix A in the presence of the block rubber, and said molding material is used for the production of films, sheets or moldings.

12 Claims, No Drawings

IMPACT-RESISTANT MOLDING COMPOUND MADE OF STYRENE POLYMERS

The present invention relates to an impact-resistant thermoplastic molding material and a process for its preparation.

Thermoplastic molding materials based on polymers of styrene and its technical equivalents styrene/acrylonitrile or methyl meth-acrylate, are transparent and rigid but unsuitable for some applications since they are very brittle.

The usual method for obtaining impact-resistant molding materials is by toughening, the polymerization of the monomers usually being carried out in the presence of a suitable rubber,.and the rubber becoming compatible with the resulting polymer or copolymer (the matrix) as a result of grafting.

Industrially, either the polymerization of the matrix is carried out in the presence of the rubber by the mass or solution method or the required grafted rubber is prepared (generally in emulsion) and the matrix polymer is added. In the mass or solution method, multistage continuous processes are preferred (for example, DE 1 770 392; DE 4 046 718; U.S. Pat. No. 2,727,884; U.S. Pat. No. 3,903,202).

Polybutadiene rubbers and butadiene/styrene block rubbers are used for toughening styrene polymers and styrene/acrylonitrile polymers, and acrylate rubbers are also employed for styrene/ acrylonitrile polymers and methyl methacrylate polymers (cf. for example DE 2 427 960 or DE 1 260 135 and EP 244 856).

Although polybutadiene containing molding materials are tough, they are not transparent. Moreover, owing to the high double bond content, they are not very weather resistant.

The preferably used method for styrene/acrylonitrile and methyl methacrylate molding materials is free radical emulsion polymerization of the rubber phase with subsequent production of a graft shell, which serves as compatibilizer for subsequent binding to the matrix phase, and coagulation of the emulsion to give particles having an average diameter of from about 100 to 1000 nm. After drying, the particles are incorporated into the prepared matrix in a further step.

The mass/solution method for the preparation of toughened styrene polymers leads to nontransparent (opaque) molding materials which are not particularly weather resistant. The emulsion method with subsequent incorporation of the graft rubber is very expensive, and sufficient weather resistance is achieved only with acrylate rubbers or with olefin rubbers having a low double bond content (EPM, EPDM).

It is an object of the present invention to prepare, by a continuous method in existing polymerization plants, toughened molding materials which are based on styrene, styrene/acrylonitrile or methyl methacrylate with a special rubber in a simple, economical manner which does not have the abovementioned disadvantages or has them to a considerably lesser extent than in the past.

It is a further object of the present invention to provide thermoplastic molding materials based on vinylaromatic (ie. styrene) monomers, copolymers of styrene and acrylonitrile and (meth)-acrylates, which not only have substantially improved mechanical properties compared with corresponding unmodified molding materials but are also transparent.

It is a further object of the present invention to provide a process by means of which the molding materials having the above-mentioned properties can be prepared.

We have found that these and other objects are achieved, according to the invention, by mass polymerization (possibly with the addition of small amounts of a solvent) of vinylaromatic monomers (A1) or mass copolymerization of vinylaromatic monomers (A1) with polar comonomers (A2) in the presence of special butadiene-containing rubbers (b) which contain random or quasi-random blocks of styrene and butadiene and which take up occlusions of matrix material (A) during the polymerization and in this form produce the soft phase (B).

The present invention relates directly to molding materials based on

A: from 60 to 98% by weight of a hard matrix A of polymerized or copolymerized units of at least one vinylaromatic monomer or at least one vinylaromatic monomer and at least one polar comonomer and B: from 2 to 40% by weight of a soft phase B formed from a hydrogenated or unhydrogenated block copolymer prepared by anionic polymerization and comprising a vinylaromatic monomer V and a diene D, which has at least one random or quasi-random block (V/D) of vinylaromatic monomer and diene per molecule and contains from 10 to 80% by weight, based on the soft phase B, of occlusions of matrix material (a) taken up during the polymerization, the percentages of A and B being based on the molding material comprising A and B.

For the abovementioned composition comprising A and B, the occlusions of matrix material (a) contained in the soft phase B are not to be included.

The starting materials, the claimed molding materials and their preparation are described in more detail in the sections below and illustrated by means of examples. Hard matrix A In general, styrene monomers are suitable as starting materials for the matrix of the polymers based on vinylaromatic monomers.

According to the invention, styrene and the conventional substituted styrenes to be regarded as technical equivalents can be used in any desired combination and mixing ratio. Styrene, alpha-methylstyrene and 4-methylstyrene or mixtures thereof are preferred. Styrene is particularly preferred.

Suitable polar comonomers A2 are polar vinyl monomers of the known structure $H_2C=CR_1R_2$, where $R_1$ is hydrogen, phenyl or lower alkyl, in particular methyl or ethyl, and $R_2$ is carboxyl, carbo-lower-alkoxy, such as carbomethoxy, carbaryloxy, such as carbophenoxy, carboxamide, carboxy-N-lower alkyl-amide, carboxy-N-phenylamide or nitrile.

Other suitable polar comonomers A2 are maleic and fumaric anhydride and their esters, half-esters and—possibly N-lower-alkyl or aryl-substituted—imides.

Examples of suitable polar comonomers A2 are acrylonitrile, maleic anhydride, maleimide, N-phenylmaleimide, maleic and fumaric half esters and diesters, methyl acrylate, methyl methacrylate, cyclohexyl methacrylate, phenyl methacrylate, methyl acrylate, butyl acrylate, methacrylamide, acrylamide and acrylic acid.

Soft phase B

According to the invention, the soft phase (rubber phase) B is formed in the polymerization of the hard matrix A in the presence of a special block rubber, occlusions (a) of matrix material A being formed and it furthermore being possible for a certain degree of grafting to take place. The block rubber is obtained by anionic polymerization of vinylaromatic monomers (V) and diene monomers (D) according to the nonprior published German Patent Application P 44 20 952.5. This is a rubber which contains blocks of vinylaromatics and dienes having a well defined or tapered transition and contains, per molecule, at least one block (referred to below as V/D) in which V and D are randomly or quasi-randomly distributed, ie. occur in very short sequences. The block copolymers contain in total from 10 to 85, preferably from 20 to 65, % by weight of diene and from 90 to 15 or from 80 to 35% by weight of the vinylaromatics. For the novel polymer materials, they are used in an amount such that the proportion of diene is from 2 to 50, preferably from 5 to 40, % by weight.

The vinylaromatic monomers V are defined as styrene and its anionically polymerizable derivatives (alpha-methylstyrene, 2-, 3- or 4-methylstyrene, 1,1-diphenylethylene, etc.).

For the purposes of the present invention, diene monomers D are anionically polymerizable dienes, such as butadiene, isoprene, piperylene and 1-phenylbutadiene. The stated monomers may be used individually or as mixtures.

For example, block copolymers which have one of the structures below are suitable for the present invention:

(1) $[V-(D/V)]_n$;
(2) $[V-(D/V)]_n-V$;
(3) $(D/V)-[V-(D/V)]_n$;
(4) $X-[[V-(D/V)]_n]_{m+1}$
(5) $X-[[(D/V)-V]_n]_{m+1}$;
(6) $X-[[V-(D/V)]_n-V]_{m+1}$;
(7) $X-[[(D/V)-V]_n(D/V)]_{m+1}$;
(8) $Y-[[V-(D/V)]_n]_{m+1}$;
(9) $Y-[[(D/V)-V]_n]_{m+1}$;
(10) $Y-[[V-(D/V)]_n-V]_{m+1}$;
(11) $Y-[[(D/V)-V]_n-(D/V)]_{m+1}$;

where V is a block composed of vinylaromatic units, (D/V) is a block composed randomly or quasi-randomly of diene and vinylaromatic units, X is a radical of an n-functional initiator, Y is a radical of a m-functional coupling agent and m and n are each a natural number from 1 to 10.

The random or quasi-random blocks in turn may be composed of a plurality of segments of differing composition or differing structure, it being possible for blocks of pure polydiene (D) to be present, for example having the following structure:

$(D/V)_1-(D/V)_2$
$(D/V)_1-(D/V)_2-(D/v)_1$
$(D/V)_1-(DN)_2-(D/V)_3$
$D-(D/V)$;
$(D/V)_1-D-(D/V)_1$;
$(D/V)_1-D-(D/V)_2$
$D-(D/V)_1-(D/V)_2$

The vinylaromatic/diene ratio in the individual blocks D/V may be identical or different or may change continuously within a block: $(D/V)_1 \rightarrow (D/V)_2$, for example, may increase or decrease, with the proviso that the glass transition temperature $T_g$ of each partblock (determined according to K. H. Illers and H. Breuer, Kolloidzeitschrift 190/1 (1963), 16–34) is less than 25° C. in each case.

Preferred polymer structures are V–(D/V); V–(D/V)–V; X–[–(D/V)–V]$_2$ and Y–[–(D/V)–V]$_2$, where the random or quasi-random block (D/V) in turn may be subdivided into blocks $(D_1/V_1)-(D_2/V_2)-(D_3/V_3)-$ . . . The random or quasi-random block preferably consists of from 2 to 15, particularly preferably from 3 to 10, random part-blocks. The division of the random block (D/V) into as many part-blocks Dn/Vn as possible has the advantage that the (DIV) block as a whole behaves like a virtually perfect, random polymer even in the case of a composition which changes within a part-block Dn/Vn (which is difficult to avoid in anionic polymerization under practical conditions).

The block copolymers contain in total from 10 to 85, preferably from 20 to 65, % by weight of the diene and from 90 to 15, preferably from 80 to 35, % by weight of the vinylaromatics.

The weight ratio of vinylaromatic V to diene D in the random (D/V) block may differ, for example may vary from 90:10 to 10:90, provided that the general condition that $T_g$ is less than 25° C. is fulfilled.

The molecular weight of the block (D/V) is usually from 200 to 350,000, preferably from 5,000 to 180,000, g/mol.

The molecular weight of the rubbers which may be used according to the invention is from 40,000 to 500,000, preferably from 50,000 to 300,000, g/mol, the weight average from analytical gel permeation chromatography being meant.

As stated above, the preparation of the elastomeric block copolymer to be used according to the invention is described in the nonprior published German Patent Application P 44 20 952.5, extracts of which are reproduced below.

Such a novel elastomeric block copolymer is obtained by forming its elastomeric blocks from a random copolymer of a vinylaromatic with a diene, within the framework of the above parameters; random copolymers of vinylaromatics and dienes are obtained by polymerization in the presence of a polar cosolvent.

Accordingly, the soft blocks of the block copolymer are prepared by anionic polymerization in a nonpolar solvent with the addition of a polar cosolvent. The concept here is that the cosolvent acts as a Lewis base with respect to the metal cation. Preferably used solvents are aliphatic hydrocarbons, such as cyclohexane or methylcyclohexane. Preferred Lewis bases are polar aprotic compounds, such as ethers and tertiary amines. Examples of particularly effective ethers are tetrahydrofuran and aliphatic polyethers, such as diethylene glycol dimethyl ether. Examples of tertiary amines are tributylamine and pyridine. The polar cosolvent is added to the nonpolar solvent in a small amount, for example from 0.5 to 5% by volume. Tetrahydrofuran in an amount of from 0.1 to 0.3% by volume is particularly preferred. Experience has shown that about 0.2% by volume is sufficient in most cases. The copolymerization parameters and the amount of 1,2- or 1,4-linkages of the diene units are determined by the metering and structure of the Lewis base. The novel polymers contain, for example, from 15 to 40% of 1,2-linkages and from 85 to 60% of 1,4-linkages, based on all diene units.

The polymerization temperature may be from 0 to 130° C. and is preferably from 30 to 100° C.

The proportion by volume of the soft blocks within the block rubber is important for the mechanical properties. According to the invention, the proportion by volume of the soft blocks composed of diene and vinylaromatic sequences is from 60 to 95, preferably from 70 to 90, particularly preferably from 80 to 90, % by volume. The blocks formed from the vinylaromatic monomers constitute, within the block rubber, a hard phase whose proportion by volume accounts for from 5 to 40, preferably from 10 to 30, particularly preferably from 10 to 20, % by volume. It should be expressly stated that this proportion by volume has nothing to do with the proportion of hard matrix A occluded according to the invention (ie. not chemically bonded). Rather, this occluded proportion is formed in the preparation, described below, of the novel molding material, for which the presence of the soft phase is essential.

For the preparation of weather-resistant and toughened polymers, it is advantageous to hydrogenate some or all of the aliphatic C=C double bonds. This can be done by known methods, as described, for example, in EP-A-475 461 or U.S. Pat. No. 4,656,230 or 4,629,767. Preferred degrees of hydrogenation of the aliphatic double bonds in order substantially to increase the weather resistance are from 60 to 100%.

The novel molding materials are obtained by the method typical for the preparation of toughened styrene polymers, for example by continuous polymerization of the monomers forming the hard matrix A, in the presence of the preformed rubber (cf. the above preparation information) in the presence or absence of a solvent (cf. U.S. Pat. No. 2,94,692) or by batchwise mass-suspension polymerization (cf. for example U.S. Pat. No. 2,862,906, EP-A-429 986 and EP-A-274 109), the soft phase B being formed with occlusion of matrix material from the rubber used. Continuous processes in which combinations of stirred kettles or reactor towers with tubular or pipe-loop reactors are provided and which accordingly have a plurality of reaction zones are particularly suitable. In order to improve the radial mixing, baffles may be provided in tubular reactors which produce no-axial-back-mixing.

Suitable solvents for the continuous mass/solution process are cycloaliphatic or aromatic hydrocarbons, such as cyclohexane, ethylbenzene, xylene, isopropylbenzene or toluene. The amount of solvent in the reaction mixture should be kept below 30, preferably below 10, % by weight, in order to achieve a high space-time yield.

The polymerization can be initiated thermally or by using decomposable peroxides or azo compounds. The initiators generally improve the grafting and hence lead to improved product properties. For example, peresters, such as tert-butyl peroxybenzoate, tert-butyl peroxyacetate, dibenzoyl peroxide and dilauryl peroxide, perketals, such as 1,1-di-tert-butylperoxycyclohexane or 1,1-di-tert-butylperoxy-3,3,5-trimethylcyclohexane, peroxides, such as dicumyl peroxide, tert-butyl hydroperoxide or tert-butyl cumyl peroxide, and percarbonates, such as tert-butyl peroxyisopropylcarbonate, are suitable. The amount of initiator used is as a rule from 0.05 to 0.3% by weight, based on monomers.

The mercaptans of 4 to 18 carbon atoms which are usually used may be employed for regulating the molecular weight. n-Butyl mercaptan, octyl mercaptan and n- and tert-dodecyl mercaptan have proven particularly useful. The amount of mercaptan used is as a rule from 0.01 to 0.3% by weight, based on the monomers.

Bifunctional compounds, such as divinylbenzene, butanediol diacrylate or allyl methacrylate, may also be used for influencing the molecular weight distribution. In order to avoid crosslinking, these are used in a very small amount, mainly in amounts of from 5 to 1500 ppm (EP-A-96 862).

The polymerization temperature used depends on whether polymerization is effected thermally or by means of initiators and may depend on the half-life of the initiator. It is in general from 70 to 200° C., preferably from 80 to 170° C. The temperature regulation over the entire reaction range is known to a person skilled in the art.

During the polymerization (in this case in particular after dissolution of the rubber in the monomer or monomers) or before the processing of the molding materials obtained, additives such as those usually used for such polymer materials may be added. For example, internal lubricants, lubricants, antioxidants or UV stabilizers, fillers, flameproofing agents or blowing agents are usually used. Depending on their nature, these additives may be used in a very small amount, eg. antioxidants or UV stabilizers, or in larger amounts, eg. glass fibers as filler, flameproofing agents or pigments, provided that no importance is attached to the transparency and materials having particular color luminosity are to be obtained.

The molding materials obtained by the novel process can be processed by all methods for processing thermoplastics, for example by extrusion, injection molding, calendering, blow-molding, foaming, compression molding or sintering; said molding materials are particularly preferably used for injection molding and extrusion.

The molding materials may also be mixed with other compatible polymers, once again taking into account the fact that the transparency may be lost. For example, the impact-resistant polystyrene molding materials prepared by this process are particularly suitable for blending with polyphenylene ethers and for the preparation of flameproofed products, suitable flameproofing agents being; for example, the conventional halogen or phosphorus compounds, phosphazenes or triazines (eg. melamine).

In the examples and comparative experiments below, amounts are by weight, unless stated otherwise. The stated mechanical values were determined by the following methods using compression molded test specimens:

Yield stress: according to DIN 53 455

Tensile strength: according to DIN 53 455

Hole impact strength: according to DIN 53 753

Transparency according to DIN 5036 (using 2 mm circular discs)

EXAMPLE 1

15 parts in each case of a styrene-styrene/butadiene-styrene three-block copolymer (S-S/B-S, where S/B is based on the above definition (V/D); V=S=styrene and B=D=diene) prepared by the method of German Patent Application P 44 20 952.5 and having a molecular weight $M_n$ of 117,000 g/mol, a butadiene content of 35% and a styrene block length $M_n$ of 12,600 g/mol were dissolved in 85 parts of styrene, and 0.1 part of tert-dodecyl mercaptan, 0.2 part of a commercial sterically hindered phenol as a stabilizer (Irganox® 1076) and 2 parts of hydrogenated mineral oil were added.

2000 g of this solution were polymerized in a stirred kettle having a capacity of 5 liters and provided with an anchor stirrer, at 135° C. and a stirrer speed of 300 min$^{-1}$. At a conversion of 40%, 1.7 g of dicumyl peroxide and a solution comprising 1800 g of water with 1.8 g of sodium carboxymethyl cellulose as protective colloid and 1.8 g of sodium diphosphate as a buffer were added to the polymerizing solution. The stirrer speed was increased to 400 min$^{-1}$ in order to obtain an emulsion. This was then polymerized for a further 3 hours at 110° C., 3 hours at 130° C. and 6 hours at 140° C. The suspension polymer was separated from the accompanying water, washed with water to remove the protective colloid and dried, and test specimens were produced at 200° C. The test specimens were transparent and had the following properties:

Yield stress: 29.5 [N/mm$^2$]

Tensile strength: 26.7 [N/mm$^2$]

Hole impact strength: 5.8 [kJ/m$^2$]

Transparency: 83 [%]

Comparative Experiment 1

The procedure was as in Example 1, but the novel block rubber was replaced by 8 parts of a commercial medium-cis-polybutadiene rubber (HX 500 produced by Bayer AG). The test specimens obtained at 200° C. were white and opaque and had the following properties:

Yield stress: 26.8 [N/mm$^2$]
Tensile strength: 25.3 [N/mm$^2$]
Hole impact strength: 4.9 [kJ/m$^2$]

EXAMPLE 2

An S-S/B-S three-block copolymer having a molecular weight M$_n$ of 142,000 and a butadiene content of 45% by weight was used for the preparation of a styrene/acrylonitrile copolymer.

9.5 parts thereof were dissolved in 71.4 parts of styrene. 24.0 parts of acrylonitrile, 0.15 part of tert-dodecyl mercaptan, 0.6 part of liquid paraffin and 0.08 part of tert-butyl perbenzoate were added to the solution. The polymerization took place as described in Example 1. Test specimens were produced from the suspension polymer at 230° C. The test specimens were transparent and had the following properties:

Yield stress: 16.8 [N/mm$^2$]
Tensile strength: 15.9 [N/mm$^2$]
Hole impact strength: 30.2 [kJ/m$^2$]
Transparency: 85 [%]

EXAMPLE 3

For the preparation of a weather-resistant, impact-resistant polystyrene, a styrene/butadiene block rubber having the structure S-(S/B)$_1$-(S/B)$_2$-(S/B)$_3$-S was first hydrogenated by adding a mixture of 0.1 g of nickel acetylacetonate, 0.2 g of triethylaluminum and 20 ml of cyclohexane (per liter) to a 15% strength anhydrous solution of the rubber in cyclohexane and treating the resulting mixture with hydrogen at 60° C. and 25 bar. The rubber had a molecular weight M$_n$ of 118,000 or M$_w$ of 177,000 and a butadiene content of 37% by weight. The styrene/butadiene ratios (S/B)$_1$, (S/B)$_2$ and (S/B)$_3$ differed and were 1.35, 0.90 and 1.25, respectively.

Polymerization was carried out as stated in Example 1, and the test specimens obtained were transparent and had the following properties:

Yield stress: 31.4 [N/mm$^2$]
Tensile strength: 28.3 [N/mm$^2$]
Hole impact strength: 6.6 [kJ/m$^2$]
Transparency: 87 [%]

EXAMPLE 4

15 parts of the styrene-styrene/butadiene-styrene three-block copolymer from Example 1 were dissolved in a mixture of 5 parts of ethylbenzene, and 80 parts of styrene. 0.1 part of tert-dodecyl mercaptan, 0.14 part of tert-butyl perbenzoate and 1 part of liquid paraffin were added to the solution. 5 liters/hour of this solution were fed to a cascade comprising 2 stirred kettles having an effective capacity of 1 and 5 liters, respectively, and 2 tower reactors having an effective capacity of 10 liters each, and polymerization was carried out. The polymer solution was fed to a devolatilization apparatus and freed from solvent and residual monomers at from 220 to 240° C. and to a reduced pressure of 10 mbar. The stirrer speeds used in the polymerization, temperatures and total conversions achieved are listed in Table 1.

TABLE 1

(Stirrer speed n-temperature-integral conversion C)

|  | n [min$^{-1}$] | Temp. [° C.] | C |
|---|---|---|---|
| 1st stirred reactor | 150 | 110 | 5.8 |
| 2nd stirred reactor | 170 | 125 | 22.8 |
| 1st tower | 15 | 135 | 52.5 |
| 2nd tower | 5 | 148 | 74.6 |

The transparent product obtained was compressed molded to give test specimens, and the following properties were determined:

Yield stress: 27.8 [N/mm$^2$]
Tensile strength: 25.9 [N/mm$^2$]
Hole impact strength: 6.5 [kJ/m$^2$]
Transparency: 86 [%]

The examples show that, with the aid of the special block rubber, it is possible to obtain molding materials which are not only impact-resistant but also transparent. The comparison of Example 1 with the comparative experiment furthermore shows that, with comparable other properties, the specific polybutadiene content can, according to the invention, be kept substantially lower, ie. the novel molding materials have better weather resistance than those available to date, even without further measures (hydrogenation).

We claim:

1. A molding material comprising:
   A: from 60 to 98% by weight of a hard matrix A of polymerized or copolymerized units of at least one vinylaromatic monomer or at least one vinylaromatic monomer and at least one polar comonomer and
   B: from 2 to 40% by weight of a block copolymer rubber phase B prepared by anionic polymerization and containing from 10 to 80% by weight, based on the block copolymer rubber phase B, of occlusions (a) of matrix material (A) formed during the polymerization f the hard matrix A in the presence of the block copolymer rubber, the total composition of the block copolymer rubber comprising from 80 to 35% by weight of a vinylaromatic monomer V and from 20 to 65% by weight of a diene D,
   and consisting of at least one random block (V/D) of vinylaromatic monomer and diene and of at least one block consisting of vinylaromat monomer V, wherein the weight ratio of vinylaromatic monomer V to diene D in the random block (V/D) is from 90:10 to 10:90.

2. A molding material as claimed in claim 1, wherein the block copolymer comprising vinylaromatic monomers V and diene D is hydrogenated.

3. A molding material as claimed in claim 1, wherein the vinyl-aromatic compound used is styrene, alpha-methylstyrene or 4-methylstyrene.

4. A molding material as defined in claim 1, wherein vinylaromatic compound used is selected from the group consisting of styrene, alpha-methyl styrene and 4-methylstyrene, and wherein the polar comonomer is selected from the group consisting of acrylonitrile, maleic anhydride, maleimide N-phenylamaleimide, a maleic or fumaric half-ester or diester methyl acrylate, methyl methacrylate, cyclohexvl methacrylate phenyl methacrylate, methyl acrylate, butyl acrylate methacrylamide methyl acrylate, butyl acrylate, methacrylamide acrylamide or acrylic acid.

5. A molding material as defined in claim 1, wherein the vinylaromatic compound used is selected from the group consisting of styrene, alphamethyl styrene and 4-methylstyrene, and wherein the polar comonomer is selected from the group consisting of acrylonitrile, maleic anhydride, maleimide, -phenylmaleimide, a maleic or fumaric half-ester or diester, methyl acrylate, methyl methacrylate, cyclohexyl methacrylate, phenyl methacrylate, butyl acrylate, methacrylamide, acrylamide and acrylic acid.

6. A process for the preparation of a molding material as claimed in claim 1 by free radical polymerization or copolymerization of the monomers in the presence or absence of a solvent, wherein the monomers are polymerized in the presence of the block copolymer.

7. A molding material as claimed in claim 1, which has a transparency of more than 60%, measured according to DIN 5036.

8. A molding material as claimed in claim 1, wherein the block copolymer structure is a member selected from the group consisting of V-(D/V); V-(D/V)-V; X-[-(D/V)-V]$_2$ and Y-[-(D/V)-V]$_2$ wherein X is a radical of a difunctional initiator and Y is a radical of a difunctional coupling agent.

9. A molding material as claimed in claim 8, wherein the block copolymer structure is a random block consisting of from 2 to 15 random blocks.

10. A molding material as defined in claim 1 wherein the block copolymer comprises from 35 to 45% by weight of a diene D and from 55 to 65% by weight of a vinylaromatic monomer V.

11. A molding material as defined in claim 1 wherein the proportion of said blocks (V/D) is from 60 to 95% by volume and the proportion of said blocks composed of vinylaromatic monomer V is from 5 to 40% by volume.

12. A molding material as defined in claim 1 wherein the block copolymer contains from 15 to 40% of 1,2-linkages of the diene units, based on all diene units.

\* \* \* \* \*

UNITED STATES PATENT AND TRADEMARK OFFICE
CERTIFICATE OF CORRECTION

PATENT NO.    : 6,346,572 B1
DATED         : February 12, 2002
INVENTOR(S)   : Loth et al.

It is certified that error appears in the above-identified patent and that said Letters Patent is hereby corrected as shown below:

<u>Column 8,</u>
Line 38, "f the" should be -- of the --.

Signed and Sealed this

Eleventh Day of June, 2002

Attest:

Attesting Officer

JAMES E. ROGAN
*Director of the United States Patent and Trademark Office*

UNITED STATES PATENT AND TRADEMARK OFFICE
CERTIFICATE OF CORRECTION

PATENT NO.     : 6,346,572 B1
DATED          : February 12, 2002
INVENTOR(S)    : Loth et al.

It is certified that error appears in the above-identified patent and that said Letters Patent is hereby corrected as shown below:

Column 8,
Lines 55-65, delete the entire claim 4, and replace with the following:
-- 4. A molding material as claimed in claim 1, wherein the polar comonomer used is acrylonitrile, maleic anhydride, maleimide, N-phenylmaleimide, a maleic or fumaric half-ester or diester, methyl methacrylate, cyclohexyl methacrylate, phenyl methacrylate, methyl acrylate, butyl acrylate, methacrylate, acrylamide or acrylic acid. --

Signed and Sealed this

Twenty-sixth Day of November, 2002

*Attest:*

*Attesting Officer*

JAMES E. ROGAN
*Director of the United States Patent and Trademark Office*